This application is a continuation of application Ser. No. 207,598, filed July 5, 1962, and now abandoned.

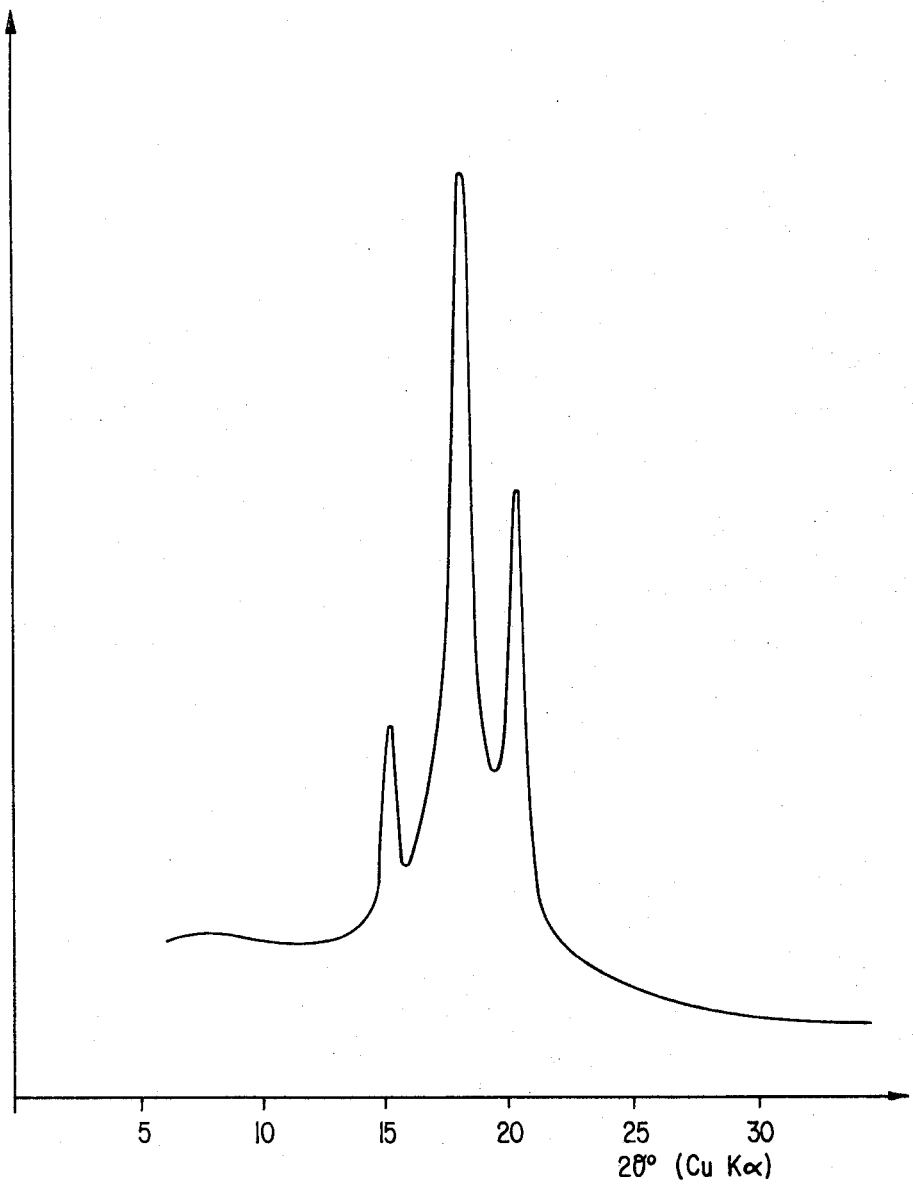
X-RAY SPECTRUM OF AN ALTERNATING THREO-DI-SYNDIOTACTIC
COPOLYMER OF ETHYLENE AND CYCLOPENTENE 3,385,840
ALTERNATING COPOLYMERS OF ETHYLENE WITH CYCLO-OLEFINS
Giulio Natta, Gino Dall'Asta, Giorgio Mazzanti, Italo Pasquon, Alberto Valvassori, and Adolfo Zambelli, Milan, Italy, assignors to Montecatini Edison S.p.A., Milan, Italy, a corporation of Italy
Continuation of application Ser. No. 207,598, July 5, 1962. This application Aug. 22, 1966, Ser. No. 574,247
Claims priority, application Italy, July 8, 1961, 12,511/61
11 Claims. (Cl. 260—88.2)

This invention relates to new high molecular weight copolymers of ethylene with cyclo-olefins, and to a process for producing them.

It was not apparent that high molecular weight linear copolymers of ethylene with cyclo-olefins could be produced.

The typical anionic catalysts for the low-pressure polymerization of ethylene and alpha-olefins, for instance those prepared from transition metal compounds and organometallic compounds of metals of Groups I-A, II, and III-A of the Mendeleef Periodic Table, do not promote the homopolymerization of cyclo-olefins.

Unexpectedly, we have found that true copolymerizates comprising solid, high molecular weight, linear copolymers of ethylene with cyclo-olefins containing 4 to 8 carbon atoms, or with their nuclearly alkylated derivatives in which the alkyl groups contain from 1 to 6 carbon atoms and are bound to a carbon atom not involved in a C=C linkage, can be obtained by contacting a mixture of the co-monomers under particular conditions with anionic catalytic systems prepared from specific compounds of transition belonging to Groups IV, V or VI of the Mendeleef Periodic Table and organometallic compounds of metals belonging to Groups I-A, II or III-A of said table.

Transition metal compounds that can be used in preparing the catalyst are $TiCl_4$, $TiCl_3$ (which can be obtained, e.g., by reducing $TiCl_4$ with hydrogen, aluminum, or with aluminum alkyls under particular conditions), $TiI_4$, $VCl_4$, $VOCl_3$, vanadium triacetylacetonate, vanadyl diacetylacetonate, alkyl orthovanadates, e.g., ethyl orthovanadate, chromyl chloride, and chromium acetylacetonate.

Organometallic compounds that are useful catalyst-forming components for our purposes include $Al(C_2H_5)_3$; $Al(C_4H_9)_2$; $Al(C_3H_7)_2Br$; $Al(C_2H_5)_2I$; $Be(C_2H_5)_2$;

$LiC_4H_9$ and $Al(C_2H_5)X_2Y$ wherein X is any halogen and Y is an "electron-donor," e.g., a tertiary or secondary amine, an "onium salt"; or an alkaline halide.

The copolymerization is carried out in a liquid diluent which may be an inert aliphatic or aromatic solvent, or the liquid cyclo-olefin to be copolymerized.

The copolymerization can be effected at temperatures ranging from −80° C. to +100° C. The preferred temperature is in the range from −50° C. to +10° C.

Depending upon the specific components from which it is formed, the catalyst may be colloidally dispersed, finely dispersed, or completely dispersed (dissolved) in the liquid phase in which the copolymerization takes place. For example, heterogeneous catalysts prepared from $TiCl_4$ and e.g., an Al trialkyl or dialkyl Al halide are usually colloidally dispersed in the liquid phase, whereas homogeneous catalysts prepared from hydrocarbon-soluble transition metal compounds, particularly certain of the hydrocarbon-soluble vanadium compounds, and particular organometallic compounds, are usually completely dispersed in the hydrocarbon liquid phase to provide a homogeneous copolymerization system. The preferred catalytic systems for use in our present process are finely dispersed catalysts freshly prepared at low temperature from (1) $VCl_4$ or $VOCl_3$ and Al trialkyls, or homogeneous catalysts freshly prepared at low temperature from (1) vanadium triacetylacetonate, vanadyl diacetylacetonate, vanadium chloroacetylacetonate, or an alkyl-orthovanadate, and (2) a dialkyl Al monohalide.

For the heterogeneous finely dispersed catalysts, the preferred organometallic compound/transition metal compound molar ratio is between 2:1 and 3:1; for the homogeneous catalysts, said molar ratio is higher than 4:1 and preferably between 4:1 and 10:1.

It is desirable to maintain a constant relative concentration of the ethylene and cyclo-olefin to be copolymerized in the liquid phase during the copolymerization reaction, in order to obtain copolymers having a composition as homogeneous as possible. This can be accomplished conveniently by carrying out the copolymerization continuously, by continuously feeding the comonomers and discharging the copolymerizate formed, or by recycling the mixture of the co-monomers to be copolymerized at appropriate rates.

Cyclo-olefins containing up to 8 carbons atoms in the cycle can be copolymerized according to our invention, i.e., cyclobutene, cyclopentene, cyclohexene, cycloheptene, and cis and trans cyclo-octene.

Alkyl cyclo-olefins which can be copolymerized with ethylene by our method include 4-methyl-cyclopentene-1, 3-methyl-cyclohexene-1, 4,5-dimethyl-cyclohexene-1.

In the copolymers we obtain, the units derived from the cyclo-olefin are linked, at both ends, to methylene groups and sequences of two or more derived from the cyclo-olefin are not present in the main chain. In fact, the cyclo-olefins (except for cyclo-butene) do not form homopolymers in the presence of the catalysts used in our process. Only in case of ethylene-cyclobutene copolymers direct enchainment between cyclo-olefin units is possible. Moreover, we have observed that even with very low molar ratios between the ethylene and cyclo-olefin (except for cyclobutene) present in the liquid phase, copolymers containing more than 50% by mols of monomer units deriving from the polymerization of the cyclo-olefin are not obtained.

The properties of the copolymers depend, in the first instance, on the cyclo-olefin content and, in the second instance, on whether or not the copolymers show a regular steric distribution of the tertiary carbon atoms present in the units derived from the cyclo-olefin along the macromolecular copolymeric main chain.

When the cyclo-olefin content is low, generally below 20% by mols, the copolymers consist of macromolecules in which the relatively low percentage of cyclo-olefin units are distributed randomly along the main chain, and the copolymers exhibit only a crystallinity of the polyethylene type (due to sequences of methylene groups) when examined under the X-rays at room temperature. Such copolymers are, however, very different in their properties from the homopolymer, polyethylene. The percent crystallinity and melting point of the copolymers, as well as their infra-red spectrum, are different from those of polyethylene per se, both the melting point and crystallinity being lower than the melting point and crystallinity of the homopolymer.

The crystallinity of the polyethylene type exhibited by said copolymers decreases sharply (more particularly when using homogeneous catalytic systems) with increase in the amount of cyclo-olefin in the copolymer up to the maximum of 50% by mols which enters the copolymer macromolecule, and our copolymers containing from 30 to 50 mol percent of the cyclo-olefin in the macromolecule can exhibit a crystallinity of a type very different from the polyethylene type and which cannot be ascribed to sequences of methylene groups.

Our crude copolymerizates are usually mixtures of the copolymers consisting of the macromolecules containing only a relatively small proportion of cyclo-olefin units and which units are distributed randomly along the main chain, and copolymers consisting of macromolecules the main chains of which contain groups of the following type (I) 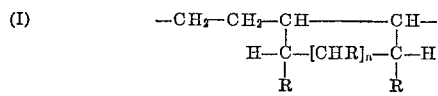

in which the R radicals are hydrogen or the same or different alkyl groups containing from 1 to 6 carbon atoms, and $n$ can be zero or an integer from 1 to 4.

The copolymers consisting of the macromolecules containing groups of type (I) in the main chain have a regular chemical structure and are more or less regularly alternating copolymers to the extent that groups of type (I) appear in immediate succession in the main chain, being pure or essentially pure alternating copolymers of completely regular chemical structure when the cyclo-olefin and ethylene are present in the macromolecule in equimolar ratios.

In many cases, our copolymers substantially consisting of macromolecules containing groups of type (I) in the main chain, and comprised in our crude copolymerizates, show both a regular chemical structure resulting from successive repetition of groups of type (I) at least for long portions or stretches of the main chain and a regular steric distribution of the tertiary carbon atoms present in the units deriving from the olefin for sections of the main chain made up of the successively repeating groups of type (I) at least sufficiently long to cause the formation of the lattice of a crystallite. Those copolymers exhibit, when examined under the X-rays at room temperature, more or less crystallinity of a type very different from polyethylene crystallinity and which must be attributed to the regular steric distribution of the tertiary carbon atoms of the cyclo-olefin units.

Our copolymers consisting of macromolecules containing equimolar ratios of the cyclo-olefin and ethylene, and which show the required regular steric distribution of the tertiary carbon atoms of the cyclo-olefin units are pure or essentially pure alternating copolymer with a completely regular chemical structure and which also exhibit a very high percent of the crystallinity of non-polyethylene type when they are examined under the X-rays at room temperature.

Our copolymers consisting of macromolecules containing the cyclo-olefin and ethylene in equimolar ratios but which do not show a regular steric distribution of the cyclo-olefin units are pure or essentially pure alternating copolymers with a regular chemical structure but which are substantially amorphous when examined under the X-rays at room temperature.

The copolymers consisting of the different kinds of macromolecules which are present in admixture in our crude copolymerizates have different solubilities in organic solvents and can be separated as fractions from the mixture by subjecting the crude copolymerizates to fractional dissolution.

We have copolymerized ethylene/cyclo-olefin starting mixtures in which the ethylene:cyclo-olefin molar ratio in the liquid phase was between 200:1 and 25:1 (ethylene partial pressures between 25 and 200 torr) and obtained, in each case, copolymerizates comprising a mixture of the copolymers having a low content of units deriving from the cyclo-olefin which were randomly distributed along the main chain, and copolymers consisting of macromolecules containing groups of type (I) in the main chain, which latter copolymers predominated in the crude copolymerizates.

Cyclopentene is a cyclo-olefin which when copolymerized with ethylene according to the present invention yields a crude copolymerizate comprising the aforesaid different kinds of copolymers, and from which the different kinds of copolymers can be separated by fractional dissolution.

The invention will be discussed in relation to the ethylene/cyclopentene copolymerizates, for illustrative purposes.

When we copolymerized ethylene/cyclopentene mixtures (Examples 1-7 hereinbelow) in which the molar ratio of the co-monomers was such that the cyclopentene content of the copolymerization product was lower than 20 mol percent, the crude copolymerizate, while being very different from polyethylene in its overall properties, nevertheless exhibited only a crystallinity of polyethylene type and attributable to the presence in the main chain of sequences of methylene groups deriving from polymerization of the ethylene.

By using starting ethylene/cyclopentene mixtures of a molar ratio (e.g., 25:1) such that the copolymerizate contained a higher proportion (over 30 mol percent of the cyclopentene), we obtained a crude copolymerizate which, when examined under the X-rays at room temperature, exhibited a crystallinity of a type different from polyethylene crystallinity, and which is illustrated in the accompanying drawings showing the spectrum we attribute to a regularly alternated, sterically ordered ethylene-cyclopentene copolymer, according to our invention and in which the tertiary carbon atoms have a regular steric configuration, as shown in the following model of a portion of the main chain of such an ethylene/cyclopentene copolymer:

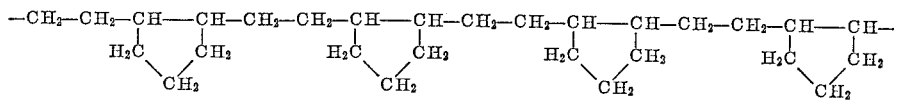

By subjecting said ethylene/cyclopentene crude copolymerizate to fractional dissolution, we obtained copolymers consisting of macromolecules containing 50% by mols of cyclopentene and the composition of which corresponds to that of a copolymer in which the two monomers are present in equimolar amounts.

The crude copolymerizates of ethylene and cyclopentene produced according to our invention and having a cyclopentene content equal to or slightly lower than 50 mols percent, exhibit the type of crystallinity shown in the drawing and, by extraction with boiling solvents, give fractions having a cyclopentene content of practically 50 mols percent, independently of the solvent which is used for the fractionation, and which can be made up of macromolecules which exhibit more or less crystallinity corresponding to a regular steric structure and whose molecular weight is more or less high.

By fractionating such crude copolymerizates by successive extractions with different boiling solvents, we obtained copolymers which were highly crystalline as determined by X-ray examination. For instance, using ether, n-hexane, n-heptane and n-octane as the successive extracting solvents, we obtained the following fractions:

(1) Ether extracts having an oily or waxy consistency and consisting of low molecular weight regularly alternated copolymers of regular chemical structure which contained about 50% by mols of cyclopentene but showed no regular steric distribution of the tertiary carbon atoms of the units derived from the cyclopentene and were, consequently, completely amorphous on X-ray analysis;

(2) n-Hexane extracts consisting of copolymers having a cyclopentene content of about 45–50% by mols, and which were plastic, substantially completely amorphous solid copolymers, or solid copolymers which exhibited a weak crystallinity of the non-polyethylene type shown in the drawing;

(3) n-Heptane extracts consisting of solid copolymers containing about 40 mols percent of cyclopentene and which exhibited some crystallinity of the type shown in the drawing;

(4) n-Octane extracts consisting of powdery solid copolymers having a cyclopentene content between 35 and 50% by mols, and which exhibited a high percent of crystallinity of the type shown in the drawing, as well as crystallinity of the polyethylene type; and (5) A residue of the n-octane extraction consisting of solid, powdery copolymers having a cyclopentene content of about 50% by mols and which exhibited a very high crystallinity of the type shown in the drawing (in general a crystallinity over 50%) and no crystallinity of the polyethylene type; these copolymers were practically pure alternated copolymers having a high regularity of steric structure of the tertiary carbon atoms.

A constant increase was observed in the percent crystallinity of the type shown in the drawing (characteristic of a sterically regular alternated copolymer) exhibited by the successively extracted fractions, the maximum of such crystallinity being found in the residue of the n-octane extraction.

Taking into account that no crude copolymerizate or fraction thereof obtained by us contained more than 50% by mols of cyclopentene, the content of monomeric units deriving from cyclopentene in the n-octane residue, the crystalline structure of those copolymers, and their infrared spectrum, all support the conclusion that the copolymers non-extractable with the solvents used and remaining as residue of the n-octane extraction consist of macromolecules made up, at least for very long sections of the main chain, of regularly alternated and sterically ordered monomeric units deriving from ethylene and cyclopentene.

The regularly alternated, sterically ordered copolymers of ethylene with cyclopentene have the following properties:

Cyclopentene molar ratio _____percent__    50
Density at 24° C. _____    1.01
Melting temperature _____° C__  183–185

Solubility:
  insoluble (both at room temperature and at the boiling point) in e.g., methanol, ethyl ether, n-octane, acetone, methylethylketone, glacial acetic acid, dioxane, dimethylformamide, carbon tetrachloride,
  soluble at the boiling point of the solvent but insoluble at room temperature in e.g., benzene, toluene, anisol, tetrahydronaphthalene, decahydronaphthalene;
  insoluble at room temperature in all the common solvents.

Infra-red examination:

$$\frac{\text{absorption of CH}_2 \text{ groups in the ring (bands at } 6.93\mu)}{\text{absorption of CH}_2 \text{ groups in the chain (bands at } 6.84\mu)} = \text{about } 1.5$$

intense band at 13.2μ (methylenic sequences of two carbon atoms);
  complete absence of bands at 13.6 and 13.9μ (methylenic sequences of more than two carbon atoms).

X-ray examination on powders:
  main reflections at lattice distances of 5.83 A., 4.92 A., 4.37 A.

X-ray examination on fibers subjected to stretching and annealing:
  identity period along the fiber axis=9.0 A.±0.2 orthorhombic elementary cell
  lattice constant: $a=8.75$ A.; $b=7.83$ A.; $c=9.0$ A. ±0.2;
  chain structure: not yet cleared up; presumably erythro-diisotactic or three-disyndioactic.

The stereoregular structure we assign to the regularly alternated, sterically ordered copolymers which constitute a high proportion of our crude ethylene/cyclopentene copolymerizate, is contained in more or less considerable amounts in the n-hexane, n-heptane and n-octane extracts and macromolecules having such stereoregular structure are practically the sole constituents of the n-octane residue. Such structure (which is illustrated in the model hereinabove) is in conformity with the following facts:

(a) Even if the ethylene partial pressure during the copolymerization is reduced, the cyclopentene molar content of the crude copolymerizate does not exceed 50% but approaches asymtotically that value (the theoretical value corresponding to the completely alternated copolymer being 50%);

(b) By fractionating such a crude copolymer having a cyclopentene molar content of about 40–47%, the fractions obtained do not present a cyclopentene molar content higher than 50% and some of them (ether extract, n-hexane extract, n-octane extraction residue) present a cyclopentene molar content of about 48–50%;

(c) By further fractionating a fraction containing exactly 50% by mols of cyclopentene, e.g., by fractional precipitation from a warm toluene solution all of the fractions obtained have a cyclopentene molar content of 50%;

(d) The presence of a high crystallinity, characteristic of a new crystalline entity, which reaches its maximum intensity in correspondence with a cyclopentene molar content of 50%;

(e) The crystallographic structure of the product, determined from the spectrum of oriented fiber;

(f) The substantial identity of the density determined experimentally ($d_4^{24}=1.01$) and of that calculated on the basis of the orthorhombic cell (having lattice constants $a=8.75$ A.; $b=7.83$ A.; $c=9.0$ A.) ($d_4^{24}=1.03$);

(g) The presence of an infra-red absorption band characteristic of methylenic sequences containing two $CH_2$ groups, and the contemporaneous absence of bands characteristic of methylenic sequences with more than two $CH_2$ groups;

(h) The impossibility of preparing cyclopentene homopolymers with the aid of the catalytic systems employed in the process of the present invention, which militates against the occurrence of sequences of cyclopentene monomeric units in the copolymer macromolecule.

By copolymerizing ethylene with other cyclo-olefins, we obtained results similar in many respects to those we obtained with ethylene and cyclopentene. For instance, by copolymerizing ethylene with cyclohexene, cycloheptene or cyclo-octene by the process of this invention, we obtain copolymers the macromolecules of which contain ethylene units and units derived from the cyclo-olefin in various ratios depending on the copolymerization conditions. Our crude copolymerizates of ethylene with cycloheptene comprised copolymers consisting of macromolecules essentially characterized by the regularly, successively alternating occurrence of ethylene units and units derived from the cycloheptene in the main chain, with the pair of tertiary carbon atoms in successive units from the cycloheptene having, at least for long sections of the main chain, the steric order which characterizes the stereoregular structure.

The copolymerization of cyclo-olefins according to the process object of the present invention involves double bond cleavage and the units derived from it are saturated;

the copolymers obtained are therefore made up of methylene group and cycloalkane groups.

The ethylene-cyclobutene copolymers distinguish themselves from the other abovementioned ethylene-cycloolefins or ethylene-alkylcycloethylene copolymers; it is in fact possible to obtain such copolymers having all ethylene to cyclobutene molar ratios comprised between 99:1 and 1:99. It is therefore most likely that in these ethylene/cyclobutene copolymers may exist direct enchainment between cyclobutene units. No crystallinity peak attributable to alternating copolymers has been found, not even in the case of 1:1 molar ratio between the two monomeric units in the copolymer. With higher ethylene units content, crystallinity characteristic of polyethylene sequences appears.

Our new ethylene/cyclo-olefin copolymers which consist of the macromolecules exhibiting crystallinity due to the regular steric distribution of the cyclo-olefin units in the main chain are plastic materials and can be used, for example, for the production of fibers, films, and other manufactured shaped articles. Our ethylene/cycloolefin copolymers consisting of amorphous or substantially amorphous macromolecules have elastomeric properties and can be used for those purposes to which elastomers are adapted.

The following examples are given to illustrate our invention.

EXAMPLES 1 to 6

The copolymerization vessel consists of a 200 cc. cylindrical apparatus provided with a side tube and cock for feeding ethylene. Air is completely removed from the vessel and replaced by anhydrous nitrogen. The reaction apparatus is then completely immersed in a bath kept at a constant temperature of −30° C.

The apparatus is then agitated by means of a shaking device (90–100 shakes/minute).

10.0 g. (0.147 mol) of pure cyclopentene, previously distilled on metallic sodium, are introduced.

One of the following catalysts, prepared immediately before starting the tests at −30° C. under nitrogen is then added depending on the particular example (see Table 1):

(1) Catalyst prepared by adding 9.0 millimols of tri-n-hexyl aluminum to a solution of 3.6 millimols of vanadium tetrachloride in 30 cc. of anhydrous n-heptane; or (2) A catalyst prepared by adding 14 millimols of diethyl aluminum monochloride to a solution of 2.8 millimols of vanadium triacetylacetonate in 30 cc. of anhydrous toluene.

After having introduced cyclopentene and the catalytic system into the polymerization vessel, an absolute total pressure of 750 torr is adjusted therein at −30° C. by means of nitrogen. Agitation is started and the apparatus is connected (by opening the stop cock) with a vessel containing radioactive ethylene having a known specific activity. (The radioactive ethylene was used to facilitate our analysis of the products.) The absolute total pressure in the reactor is maintained by means of a bubbler filled with butyl phthalate, at values of:

(1) 850 torr,
(2) 800 torr or
(3) 775 torr, depending on the particular example.

Therefore, in the polymerization apparatus, there are, in the 3 aforementioned cases, the following partial pressures:

(1) Ethylene partial pressure=100 torr, nitrogen+solvent+cyclopentene partial pressure=750 torr (2) Ethylene partial pressure=50 torr, nitrogen+solvent+cyclopentene=750 torr.

(3) Ethylene partial pressure=25 torr, nitrogen+solvent+cyclopentene partial pressure=750 torr.

Since the conversion of cyclopentene is rather limited, the variations with time in the ratio between the concentrations of ethylene and cyclopentene are small. The copolymerization time in all of Examples 1 to 6 is 7 hours. The equilibrium between ethylene in the gaseous phase and that present in the liquid phase is constantly assured by a vigorous agitation.

The copolymerization is stopped by pouring the reaction product into an excess of methanol (500 cc.) containing 5 cc. of conc. hydrochloric acid. After some hours the precipitated copolymer is filtered, washed with boiling methanol and dried under reduced pressure at 100° C.

The ethylene content of the copolymer is determined by radiochemical analysis and the cyclopentene content is directly determined by infra-red analysis from the ratio between the intensity of the absorption of the cyclic methylenic groups and that of the absorption of the open-chain methylenic groups (absorption bands at $6.93\mu$ and at $6.84\mu$ of the infra-red spectrum registered with $CaF_2$ optics).

The copolymerization conditions of Examples 1 to 6 and the results obtained are reported in Table 1.

TABLE 1.—COPOLYMERIZATION OF CYCLOPENTENE WITH ETHYLENE

| Example | Catalyst | $C_2H_4$, Torr pressure | Copolymer obtained, g. | $[\eta]$ at 135° C. in tetrahydronaphthalene | Cyclopentene molar content in the crude product,[1] percent |
|---|---|---|---|---|---|
| 1 | $VCl_4/Al(hexyl)_3$ | 100 | 4.29 | 1.74 | 39.2 |
| 2 | do | 50 | 1.97 | 0.98 | 45.2 |
| 3 | do | 25 | 0.97 | 0.90 | 47.2 |
| 4 | $V(acetylacetonate)_3/AlEt_2Cl$ | 100 | 2.41 | 2.25 | 35.7 |
| 5 | do | 50 | 0.97 | 0.86 | 44.7 |
| 6 | do | 25 | 0.44 | 0.89 | 46.3 |

[1] Determined by radiochemical analysis and confirmed by infra-red spectrophotometry.

The products obtained according to the conditions reported in Table 1 consist of ethylene-cyclopentene copolymers whose cyclopentene content decreases by increasing the ethylene partial pressure used in the copolymerization.

In all the above examples the non-fractionated polymers present (by X-ray examination) a high crystallinity of the type illustrated in the drawing (Geiger registration of the spectrum of a powdery sterically regular alternated ethylene-cyclopentene copolymer).

In Examples 2, 3, 5 and 6 the products are particularly rich in cyclopentene and the X-ray diffraction spectrum, registered with a Geiger counter, does not reveal the presence of a crystallinity of the type deriving from sequences of ethylene monomeric units.

The corresponding spectra of Examples 1 and 4 on the contrary, in addition to showing a high crystallinity deriving from the presence of large amounts of alternated copolymer, also show a weak crystallinity due to sequences of ethylene monomeric units.

The crude copolymerizates described in Table 1 are in the form of white powders. They can be easily extruded at about 200° C. into filaments which can be hot-stretched. The X-ray examination of these stretched filaments gives a spectrum of oriented fibre which is very rich in reflections attributable to an alternated ethylene-steric structure.

While in spectra of this type obtained from crude copolymerizate samples prepared according to Examples 2 and 3 (heterogeneous catalyst) a weak crystallinity of the type characteristic of polyethylene is also observed, the spectra of this type obtained from crude copolymerizate samples prepared according to Examples 5 and 6 (with a catalyst soluble in the reaction medium) do not present any crystallinity of the polyethylenic type but only the crystallinity attributable to the alternated ethylene-cyclopentene copolymer.

The crude copolymerizates can be fractionated, e.g. by successive extractions with boiling solvents having a progressively increasing boiling point. The following fractions have been separated from crude copolymerizates obtained according to Example 2:

ether extract
n-hexane extract
n-heptane extract
n-octane extract
extraction residue The crude copolymerizates of Examples 3–6 were separated into the following fractions:

ether extract
n-octane extract
extraction residue

In one case (Example 1) the crude copolymerizate was fractionated as follows:

the crude copolymerizate was completely dissolved in boiling toluene; after cooling the solution to room temperature the portion of precipitated copolymer was filtered while the solution was dried and the copolymer therein dissolved was recovered.

The following fractions were thus obtained:

toluene extract
residue from the toluene extraction

The results of the fractionation of the crude copolymerizates of Example 2 to 6 are reported in Table 2.

The extraction residue of Example 2 for instance presents the following properties:

Cyclopentene molar content _____ percent __ 50
Density at 24° C _____ 1.01
Melting temperature (determined under the
  microscope) _____ °C __ 183–185
Intrinsic viscosity [η] at 135° C. in tetra-
  hydronaphthalene _____ 1.01

Solubility:
  insoluble (both at room temperature and at the boiling point of the solvent) e.g. in: methanol, diethyl ether, n-octane, acetone, methylethylketone, glacial acetic acid, dioxane, dimethylformamide and carbon tetrachloride;
  soluble at the boiling temperature of the solvent but insoluble at room temperature e.g. in: benzene, toluene, anisol, tetrahydronaphthalene, decahydronaphthalene, ortho-dichloro-benzene and nitrobenzene.

No solvent has been found to be capable of dissolving this copolymer at room temperature, even after a long contact time.

Infra-red examination:

$$\frac{\text{absorption of } CH_2 \text{ groups in the ring (bands at } 6.93\mu)}{\text{absorption of } CH_2 \text{ groups in the chain (bands at } 6.84\mu)} = 1.5 \text{ (approximately)}$$

an intense band at 13.2μ, attributable to methylenic sequences of two carbons;
complete absence of bands between 13.6μ and 13.9μ which are characteristic of methylenic sequences of more than 2 carbon atoms.

X-ray examination on powders (see the drawing):
  the main reflections lay at lattice distances of 5.83 A., 4.92 A. and 4.37 A.
X-ray examination on stretched and annealed fibers:
  identity period along the fiber axis of 9.0 A.±0.2
  orthorhombic elementary cell;
  lattice constants $a=8.75$ A.; $b=7.83$ A.; $c=9.0$ A. ±0.2.

The X-ray spectrum, registered with a Geiger counter, of a sample moulded from the extraction residue of Example 2, is shown in the drawing. The residue of the octane extraction according to all the other examples reported in Table 2, also show practically the same X-ray spectrum. All the other properties reported above are also characteristic of the n-octane extraction residues of Examples 2–6 with the exception of the intrinsic viscosity the values for which are reported in Table 3.

TABLE 2

| Example (according to Table 1) | Ether extract, percent by weight | n-Hexane extract, percent by weight | n-Heptane extract, percent by weight | n-Octane extract, percent by weight | Extraction residue, percent by weight |
|---|---|---|---|---|---|
| 2 | 10.0 | 11.1 | 6.3 | 16.8 | 55.8 |
| 3 | 17.3 | | | 45.2 | 37.5 |
| 4 | 32.2 | | | 27.9 | 39.9 |
| 5 | 4.8 | | | 21.8 | 73.4 |
| 6 | 19.4 | | | 35.6 | 45.0 |

The fractions obtained by fractionation with boiling solvents (as shown in Table 2), are as follows:

The ether extracts have an oily-waxy consistency. They consist of low molecular weight amorphous copolymers containing about 50% by mols of cyclopentene. They are therefore alternated cyclopentene-copolymers which do not present any stereoregularity and, therefore, do not exhibit any crystallinity.

The n-hexane extracts have a plastic consistency. They consist of solid copolymers which are substantially amorphous or present a very low crystallinity of the type shown in the drawing. Their cyclopentene content by mols is about 45–50%; their density is: $d_4^{23}=0.98$.

The n-heptane extracts consist of solid products which by X-ray examination present a low crystallinity of the type shown in the drawing. Their cyclopentene content by mols corresponds to about 40%.

The n-octane extracts consist of solids which by X-ray examination exhibit a high crystallinity of the type shown in the drawing, accompanied by a considerable crystallinity of the polyethylene type. Their cyclopentene content by mols varies from 35 to 50%.

In this copolymer there is present most of the ethylene which in the crude copolymerizate was in excess of the unitary ethylene/cyclopentene molar ratio.

The extraction residues are white powders. They have a very high crystallinity (higher than 50%) of the type shown in the drawing and are completely free from crystallinity of the polyethylene type. Their cyclopentene content by mols is exactly 50%. They are therefore pure alternated ethylene/cyclopentene copolymers having a high regularity of steric structure.

TABLE 3

| Octane extraction residue of the Example | 1 | 2 | 3 | 4 | 5 | 6 |
|---|---|---|---|---|---|---|
| [η] at 135° C. in tetrahydronaphthalene | N.d. | 1.01 | 1.29 | 2.06 | 0.93 | 1.04 |

The sample obtained according to Example 1 was fractionated with toluene according to the procedure already described:

the toluene extract amounting to 24% by weight of the crude polymerizate, is a soft, rubbery-plastic product having a cyclopentene molar content of 49%. It consists essentially of an amorphous alternated ethylene/ cyclopentene copolymer lacking stereoregularity; its density is 0.06.

temperatures slightly higher than 100° C. into flexible transparent laminae.

TABLE 4.—COPOLYMERIZATION OF CYCLOHEXENE WITH ETHYLENE

| Example | Catalyst | $C_2H_4$ pressure, Torr | Solvent | Cyclohexene | Copolymer obtained, g. | $[\eta]$ at 135° C. in tetra-hydronaphthalene | Cyclohexene molar content of the crude copolymerizate,[1] percent |
|---|---|---|---|---|---|---|---|
| 8 | $VCl_4/Al(hexyl)_3$ | 50 | 30 cm.³ n-heptane | 10.0 (12.2 cm.³) (~0.122 mol). | 1.38 | 1.61 | 13.6 |
| 9 | do | 25 | do | do | 0.56 | 1.04 | 19.5 |
| 10 | $V(acetylacetonate)_3/AlEt_2Cl$ | 50 | 30 cm.³ toluene | do | 0.80 | 1.25 | 13.2 |
| 11 | $VCl_4/Al(hexyl)_3$ | 12.5 | | 45.0 cm.³ | 0.24 | 0.68 | 26.5 |

[1] Determined by radiochemical analysis and confirmed by infra-red spectrophotometry.

The toluene residue, amounting to 76% by weight of the crude polymer, is a powdery product having a melting temperature at 180–185° C. Its intrinsic viscosity determined in tetrahydronaphthalene at 135° C. is 1.84. It presents the following characteristics determined on a standard moulded specimen (dumbell):

Yield point _____kg./cm.² 200–205
Tensile strength _____kg./cm.² 480
Elongation at break_____percent 360
Shore D hardness_____ 65
Rockwell hardness _____ 51

Its cyclopentene molar content is 40%.

The products can be moulded or spun at temperatures from 10° to 50° C. above their melting or softening temperatures.

EXAMPLE 7

The copolymerization of ethylene with cyclopentene is carried out as described in Example 5 by operating in the absence of diluting medium, i.e., replacing all the solvent with cyclopentene which therefore is used in a total amount of 30 cc. Then proceeding as described in Examples 1 to 6, 0.6 g. of a crude polymerizate having an intrinsic viscosity of 0.98 are obtained. It exhibits a high crystallinity of the type characteristic for the aforementioned alternated ethylene/cyclopentene copolymer, and no crystallinity of the polyethylene type.

The extraction of this crude polymerizate with ether and n-octane leaves an insoluble residue amounting to 61.2% of the total.

The intrinsic viscosity of the residue determined in tetrahydronaphthalene at 135° C., is 1.07. It presents an X-ray diffraction spectrum very similar to that shown in the drawing.

Its other properties also correspond to those of the n-octane residue of Example 2.

EXAMPLES 8–11

The copolymerization apparatus and the procedure are the same as those described for Examples 1 to 6.

The runs are carried out with cyclohexene (instead of cyclopentene), purified by distillation on metallic sodium. The polymerization temperature (−30° C.) and time (7 hours) are those used with cyclopentene (Examples 1 to 6). The polymerization conditions are illustrated in Table 4. (In Example 11 no diluting medium is used; the liquid phase consists exclusively of cyclohexene.)

The products obtained under the conditions reported in Table 4 consist of crude ethylene-cyclohexene copolymerizates the cyclohexene content of which decreases by increasing the ethylene partial pressure used in the copolymerization. The crude copolymerizates have an X-ray diffraction spectrum in which, near to a low crystallinity of the polyethylenic type, there is also a maximum characteristic of amorphous copolymers and the position of which is clearly different from the maximum characteristic of polyethylene.

The said ethylene-cyclohexene copolymers are in the form of white powders which can be easily molded at The crude copolymerizates of ethylene with cyclohexene can be fractionated e.g., by successive extractions with boiling solvents having increasing boiling points. The following fractions have been separated:

ether extract
n-hexane extract
n-heptane extract
extraction residue

The results obtained by fractionation of the crude copolymerizates of Examples 8 to 11 are reported in Table 5.

TABLE 5.—FRACTIONATION OF ETHYLENE-CYCLOHEXENE COPOLYMERIZATES

| Example (according to Table 4) | Ether extract, percent by weight | n-Hexane extract, percent by weight | n-Heptane extract, percent by weight | Extraction residue, percent by weight |
|---|---|---|---|---|
| 8 | 13.9 | 19.3 | 34.8 | 32.1 |
| 9 | 37.9 | 16.5 | 22.1 | 23.5 |
| 10 | 15.1 | 8.2 | 68.4 | 8.3 |
| 11 | 73.1 | 9.6 | 17.3 | 0 |

The fractions of Table 5, have the following composition:

the ether extracts have an oily consistency. They consist of low molecular weight amorphous ethylene-cyclohexene copolymers.

The hexane extracts have a plastic consistency. They consist of ethylene-cyclohexane copolymers containing 30 to 40% of cyclohexene by mols. By X-ray examination they present a spectrum in which the crystallinity bands are practically absent and the amorphous maximum is characteristic of smectic polymers. These copolymers can be easily hot molded, giving transparent laminae. They can also be extruded to stretchable fibers. The fiber spectrum presents a very low crystallinity of the polyethylene type. The copolymer extractable with n-hexane contains large amounts of sequences of the type:

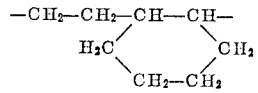

The n-heptane extracts have a powdery consistency. They consist of ethylene-cyclohexene copolymers containing 10% to 25% of cyclohexene by mols. Their X-rays spectrum can be attributed to the presence of sequence of alternating ethylene-cyclohexene copolymer having a partially ordered steric structure.

The copolymers of the extraction residues present a high crystallinity of the polyethylene type. They consist of ethylene-cyclohexene copolymers containing 3 to 10% of cyclohexene by mols.

EXAMPLE 12

The copolymerization of ethylene with cycloheptene is carried out in the apparatus and with the technique described in Examples 1 to 6.

19.2 g. (0.2 mol) of cycloheptene, distilled on metallic sodium; and a catalyst prepared at −30° C., according to the technique described in Examples 1 to 6, from 3.6 millimols of vanadium tetrachloride and 9.0 millimols of aluminum tri-hexyl, and 77 cc. of n-heptane are introduced into the reactor.

The partial ethylene pressure maintained in the copolymerization apparatus is 100 torr and the temperature is —30° C. The copolymerization time is 7 hours.

After 7 hours the copolymerization is stopped and the reaction product is poured into 500 cc. of methanol containing 5 cc. of 38% hydrochloric acid. After some hours the precipitated copolymer is filtered, washed with boiling methanol and dried under a pressure of 12 torr at 60° C.

3.6 g. of an ethylene-cycloheptene copolymerizate consisting of a slightly rubbery but not tacky mass are thus obtained.

The content of ethylene units, determined by radiochemical analysis, of the copolymerizate is 35.7% by weight (65.5% by mols) and its content of cycloheptene units is 64.3% by weight (34.5% by mols).

The X-rays examination of the total crude copolymerizate reveals the presence of weak crystallinity bands attributable to polyethylene sequences in the copolymer, and of a wide intense band, characteristic of amorphous polymers, which can not be ascribed to polyethylene sequences.

The intrinsic viscosity of the crude copolymerizate determined in tetrahydronaphthalene at 135° C., is 1.8. This is a true ethylene-cycloheptene copolymer as is demonstrated by the fact that, by extraction with boiling solvents, it was not possible to isolate fractions consisting of one of the two homopolymers; on the contrary fractions containing characteristic amounts of units deriving from the two monomers are always obtained.

The crude copolymerizate was fractionated by successive extractions with boiling solvents.

The following fractions were thus obtained:

ether extract (fraction soluble in boiling diethyl ether);
n-hexane extract (fraction insoluble in boiling diethyl-ether but soluble in boiling n-hexane);
n-heptane extract (fraction insoluble in boiling ethyl ether and n-hexane but soluble in boiling n-heptane);
benzene extract (fraction insoluble in boiling diethyl ether, n-hexane and n-heptane but soluble in boiling benzene);
benzene residue (fraction insoluble in all the aforementioned solvents).

The percentages of these fractions in respect of the total are:

| | Percent |
|---|---|
| Ether extract | 5.4 |
| n-Hexane extract | 3.6 |
| n-Heptane extract | 7.7 |
| Benzene extract | 69.4 |
| Benzene residue | 13.9 |

The benzene residue is a fibrous white substance having an intrinsic viscosity, determined in tetrahydronaphthalene at 135° C., of 3.2.

From the radio-chemical examination, the benzene extract consists of a copolymer containing 96% by mols of ethylene units and 4% by mols of cycloheptene units. By X-rays examination it shows only the crystallinity band attributable to sequences of methylene groups.

The benzene extract is a fibrous slightly rubbery mass. It has an intrinsic viscosity, determined in tetrahydronaphthalene at 135° C., of 1.4. From the radiochemical examination, it consists of a copolymer containing 58% by mols of ethylene units and 42% by mols of cycloheptene units. It is insoluble, both at room temperature and at the boiling point, in various solvents, such as n-hexane, n-heptane, diethyl ether, methanol, n-butanol, acetone, methylethylketone, ethylacetate, and dimethylformamide. It is insoluble or scarcely soluble at room temperature but soluble at the boiling point in the following solvents:

benzene
n-octane
tetrahydrofurane
anisole
chlorobenzene

It is on the contrary soluble, both at room temperature and at the boiling point, in some solvents including cyclohexane and carbon tetrachloride.

The benzene extract softens at temperatures above about 60° C.; complete melting however occurs at about 160° C.

The X-rays diffraction spectrum determined on powders (CuKα radiations, recorded with a Geiger counter) previously annealed in n-hexane or on filaments stretched and annealed in water reveals the presence of intense crystallinity bands at:

$$2\vartheta = 8.75° \text{ (md.); } 16.5° \text{ (f.); } 18.65° \text{ (d.)}$$

which correspond to lattice distances of 10.10 A.; 5.37 A. and 4.76 A. respectively.

None of these bands is attributable to polyethylene sequences.

On the basis of the identity period of 9.0 A.±0.2 (obtained by X-rays examination of filaments stretched and annealed in water at 60° C.) said crystallinity bands are attributable to the presence, in the copolymer of the benzene extract, of a high percentage (85% by mols) of sequences characterized by the regular alternating succession of ethylene and cycloheptene units in which the tertiary carbon atoms of the main chain are sterically ordered.

The structure of said sequences is schematically represented in the following model of a portion of the main chain:

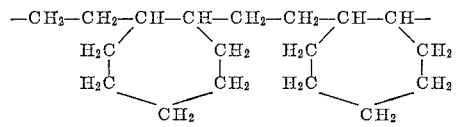

The infra-red spectrophotometric examination of hot-molded laminae shows that the cycloheptene units are contained in this copolymer in the form of cycloheptane rings.

No band attributable to double bonds can be noted in said spectrum as would occur if the copolymerization of the cycloheptene had taken place by opening of the rings instead of by opening of cyclo-olefin double bonds.

Moreover, the existence of an intense band at 6.88μ (spectrum in calcium fluoride) reveals the presence of methylenic groups in cycles. These analytical results confirm the above structure of a copolymer essentially characterized by the regular alternation of ethylene and cycloheptene units.

The n-heptane extract of the copolymer is a white rubbery mass having an intrinsic viscosity, determined in tetrahydronaphthalene at 135° C., of 1.9.

By radiochemical examination it consists of a copolymer containing 70.5% by mols of ethylene units and 29.5% by mols of cycloheptene units.

By X-rays examination it shows weak crystallinity bands due to polyethylene sequences and a wide intense absorption at 2ϑ= about 17° (CuKα radiations) attributable to the presence of a certain percentage of sequences in which ethylene units alternate successively with cycloheptene units in the main chain, but the sequences are not sufficiently long to permit their crystallization.

The n-hexane extract of the crude copolymerizate is a waxy white mass having an intrinsic viscosity, determined in tetrahydronaphthalene at 135° C., of 0.45. On the basis of the radiochemical examination it consists of 55% of ethylene units and 45% of cycloheptene units.

By X-rays examination it consists essentially of an alternating ethylene-cycloheptene copolymer having low crystallinity. Crystallinity bands at $2\vartheta=8.75°$ (md.); 16.5° (f.); 18.65° (d.).

It distinguishes from the corresponding alternating crystalline copolymer of the benzene extract by having a lower steric purity of the tertiary carbon atoms and a lower molecular weight, both factors determining its greater solubility in organic solvents.

The ether extract consists of low molecular weight oily amorphous copolymers of ethylene and cycloheptene, having an intrinsic viscosity, determined in tetrahydronaphthalene at 135° C., of 0.3.

The content of ethylene units amount to 72% by mols and that of cycloheptene units to 28% by mols.

EXAMPLE 13

The copolymerization of ethylene with cycloheptene is carried out as described in Example 12, except that a partial pressure of radioactive ethylene of 50 torr is used.

By proceeding as described in Examples 1-6 and 12, 0.95 g. of an ethylene-cycloheptene copolymerizate having an ethylene units content (determined by radiochemical analysis) of 33% by weight (63% by mols) and a cycloheptene units content of 67% by weight (37% by mols), and having an intrinsic viscosity, determined in tetrahydronaphthalene at 135° C., of 1.5 are obtained.

The copolymerizate, apart from the slightly higher content of cycloheptene units and a lower intrinsic viscosity, has properties very similar to those of the crude copolymerizate described in Example 12.

By fractionating the copolymerizate according to the procedure described in Example 12, the following fractions are obtained:

| Extract | Percent of total by weight | Percent ethylene units (mols) | Percent cycloheptene units (mols) |
|---|---|---|---|
| Ether | 6.0 | 75 | 27 |
| n-Hexane | 22.5 | 52 | 48 |
| n-Heptane | 17.0 | 64 | 36 |
| Benzene | 47.7 | 58 | 42 |
| Benzene residue | 6.7 | 95 | 5 |

The properties of these fractions are very similar to those described for the corresponding fractions of the sample of Example 12.

The benzene extract (sample previously annealed in boiling hexane) shows, on X-ray examination, intense bands of crystallinity at $2\vartheta=8.75°$ (md.); 18.5 (f.); 18.65° (d.) attributable to the presence, in the copolymer, of a high percentage of sequences of ethylene units alternating regularly and successively with cycloheptene units, in which the tertiary carbon atoms are sterically ordered.

The n-hexane extract also presents such crystallinity type, to a lesser extent.

EXAMPLE 14

The copolymerization of ethylene with cyclopentene is carried out as described in Examples 1 to 6 by using 0.2 mol of cyclopentene and a catalyst prepared at −30° C. as described above from 3.6 mm. of vanadium triacetylacetonate, 18 mm. of aluminum diethylmonochloride and 60 cc. of anhydrous toluene.

Copolymerization conditions:
  Temperature _____° C__ −30
  Time _____hours__ 7
  Partial pressure of radioactive ethylene _torr__ 50
Results:
  Crude copolymer amount _____g__ 1.46
  Ethylene units content (determined by radiochemical analysis) (=50% by mols)
      percent by wt__ 23
  Intrinsic viscosity [η] in tetrahydronaphthalene at 135° C. _____ 0.7

The crude copolymer is fractionated by extraction with boiling solvents. The results obtained are reported in the following table:

TABLE 6

| Fraction | Percent proportion on crude copolymer | Ethylene units content, percent by mols | X-rays examination |
|---|---|---|---|
| Ether extract | 12.0 | (¹) | Amorphous. |
| n-Hexane extract | 16.8 | 50 | Smectic. |
| n-Heptane extract | 26.9 | 51 | Do. |
| Benzene extract | 42.5 | 51.5 | Crystalline. |
| Residue | 1.5 | (¹) | Not determined. |

¹ Not determined.

The benzene extract essentially consists of macromolecules having a structure of a regularly alternating copolymer. The crystallinity bands shown by such example, after annealing in boiling n-hexane, are due to the regularity of steric structure of the tertiary carbon atoms in the cycloheptanic rings. The degree of crystallinity amounts to about 40-50%. The position of the bands of a powder spectrum recorded with a Geiger counter (CuKα radiations) is: $2\vartheta=9.8°$; 16.1°; 20.0°; 21.7°, approximately.

EXAMPLE 15

The technique described in Examples 1-6 was employed for the copolymerization of ethylene with cis-cyclo-octene, using:

0.2 mol (22.0 g.) of cis-cyclo-octene distilled on metallic sodium;

a catalyst freshly prepared at −30° C. from 3.6 millimols of vanadium acetylacetonate and 18 millimols of aluminium diethyl monochloride in 60 cc. of toluene according to the technique described in Examples 4-6.

The partial ethylene pressure used is 100 torr, the copolymerization time 7 hours, and the copolymerization temperature −30° C.

An ethylene-cis-cyclo-octene copolymerizate (0.61 g.) was thus obtained. It has a plastic consistency and a content of ethylene units (determined by radiochemical analysis) of 40% by weight (72.4% by mols) and a content of cis-cyclo-octene units of 60% by weight (27.6% by mols).

The intrinsic viscosity, determined in tetrahydronaphthalene at 135° C., was 1.2.

By X-rays examination it presents a wide maximum characteristic of amorphous copolymers, accompanied by a weak crystallinity of the type which is characteristic of polyethylene sequences.

The infra-red spectrophotometric analysis reveals the presence of cyclo-octane units (band at $8.90\mu$ in the spectrum recorded with $CaF_2$ optics) and the absence of double bonds.

The cis-cyclo-octane units are therefore originated by opening of the olefinic double bond and not by opening of the cyclo-octene rings.

By extraction with boiling solvents according to the techniques described in Examples 1-6 and 12, the following fractions can be separated from the crude copolymerizate:

| Extract | Percent of total by weight | Percent ethylene units (mols) | Percent cis-cyclooctene units (mols) |
|---|---|---|---|
| Ether | 31 | 69 | 31 |
| n-Hexane | 34 | 68 | 32 |
| n-Heptane | 19.4 | 75.5 | 24.5 |
| n-Heptane residue | 15.4 | 73 | 27 |

The ether extract consists of waxy tacky substances which, by X-rays examination, are amorphous.

The n-hexane extract is a white mass X-ray examination of which reveals the presence of a high absorption at $2\vartheta(CuK\alpha)=17-18°$, attributable to sequences of alternating ethylene-cis-cyclo-octene copolymer having a partially ordered steric structure, and a weak crystallinity due to short polyethylene sequences.

The n-heptane extract is a white mass the X-rays examination of which reveals the presence of amorphous copolymer and of sequences of crystalline polyethylene.

The n-heptane residue shows the same characteristics as the n-heptane extract.

EXAMPLE 16

By the technique described in Exampels 1–6, the copolymerization of ethylene with cis-cyclo-octene is carried out using:

0.2 mol (22.0 g.) of cis-cyclo-octene distilled on metallic sodium
a catalyst freshly prepared at —30° C. from 3.6 millimols of vanadium tetrachloride and 9.0 millimols of aluminum tri-n-hexyl in 77 cc. of n-heptane; and
a partial ethylene pressure of 100 torr, a copolymerization time of 7 hours, and a copolymerization temperature of —30° C.

The crude copolymerizate which was isolated (1.35 g.) was a white powdery material.

It has a content of ethylene units (determined by radiochemical analysis) of 75% by weight (92% by mols) and a content of cis-cyclo-octene units of 25% by weight (8% by mols), and an intrinsic viscosity, determined in tetrahydronaphthalene at 135° C., of 4.6.

By X-rays examination this copolymerizate shows intense bands of crystallinity attributable to polyethylene sequences. The infra-red spectrophotometric examination shows that the cis-cyclo-octene units are present in the copolymer in the form of cyclo-octane rings.

EXAMPLE 17

The copolymerization apparatus consists of a 250-cc. three necked flask provided with an agitator, a dropping funnel and a side tube for feeding nitrogen.

Into this apparatus kept under anhydrous nitrogen at the temperature of —60° C., 100 cc. of a n-heptane and a catalytic mixture previously prepared in a flask at —30° C. by reacting 3.6 millimols of $VCl_4$ dissolved in 30 cc. anhydrous n-heptane and 9.00 millimols of $Al(n-C_6H_{13})_3$, are introduced.

Ethylene is then fed at the flow rate of 10 l/h.

At the same time, through the dropping funnel cooled to —60° C., a solution of 10 g. of cyclobutene in 50 cc. n-heptane is added dropwise.

The dropping rate is 10 drops of solution per minute.

The total solution therefore added within about 3 hours. At the end of the introduction of cyclobutene, the ethylene feeding is stopped and the apparatus is still kept at —60° C. for 1 hour while agitating.

The reaction product is then poured into 1 litre methanol containing 10 cc. of concentrated hydrochloric acid.

The precipitated copolymer is washed with methanol and vacuum dried at about +50° C.

28 g. of ethylene-cyclobutene copolymer having a molar ethylene content of 77% are thus obtained.

By X-rays examination the copolymer exhibits the crystallinity characteristic for polyethylene sequences.

EXAMPLE 18

250 cc. three-necked flask provided with an agitator, a dropping funnel with outer cooling jacket, and a gas inlet tube is cooled to —60° C.

In the apparatus air is replaced by dry nitrogen and 100 cc. of anhydrous toluene are introduced. A catalytic mixture previously prepared at —30° C. according to the modalities of Examples 4 to 6 from 40 cc. of anhydrous toluene, 3.6 millimols of vanadium acetylacetonate and 18 millimols aluminum diethyl monochloride is then added. Agitation is started and the whole is kept at —60° C.

Cyclobutene and ethylene are then introduced almost contemporaneously during a period of 3 hours according to the following technique:

a solution of 3.9 g. (73 millimols) of cyclobutene in 50 cc. of anhydrous toluene is placed in the dropping funnel cooled to —78° C., and is introduced dropwise during 3 hours into the reaction flask. A flow of 0.50 litre/hour of ethylene marked radioactively with $^{14}C$ is bubbled at the same time through the solution. All ethylene introduced is absorbed by the reaction mixture. As soon as all cyclobutene has been introduced into the reaction mixture, the introduction of ethylene is stopped. The total ethylene amount introduced is 1.88 g. (67 millimols).

After introduction of the two monomers the whole is agitated at —60° C. for further two hours.

The reaction is then stopped by adding 10 cc. of methanol. The flask is left to reach the room temperature and the gelatinous mixture is poured in 1 litre of methanol containing 10 cc. of 38% hydrochloric acid. The copolymer obtained is filtered, washed with boiling methanol and dried under reduced pressure.

5.15 g. (88% of the monomers introduced) of a white powdery product which is plastic but not tacky are thus obtained.

This product has an intrinsic viscosity, determined in tetrahydronaphthalene at 135° C. of 0.8. On the basis of the radiochemical analysis the crude copolymer appears to consist of 33.4% by weight (49.2% by mols) of units deriving from ethylene and 66.6% by weight (50.8% by mols) or units deriving from cyclobutene. The infrared examination does not reveal the presence of double bonds in the copolymer, thus showing that the cyclobutenic units therein contained are present in the form of cyclobutane rings.

The X-rays examination shows that the copolymer is completely amorphous.

The copolymer is insoluable at room temperature, and partially insoluble also at the boiling point of the solvent, e.g., in diethyl ether, tetrahydrofurane, n-heptane, methylethylketone, carbon tetrachloride, acetophenone and anisole. It is soluble e.g., in boiling toluene and tetrahydronaphthalene.

The crude copolymer softens at about 120–146° C. By heating to 150° C. it can be easily moulded and extruded into filaments.

The results we obtain by repeating the foregoing examples with the following catalyst systems are similar to those shown in the examples:

$VCl_5$; $VCl_4$; $VBr_4$; $VOCl_3$; $TiCl_4$; $TiBr_4$; $(CH_3COO)_2$ $TiCl_2$/Al alkylmonohalides or alkyls of Al, Be, Zn, Na and Li, in which the alkyl groups contain 1 to 18 carbon atoms;

V triacetylacetonate; vanadyldiacetylacetonate;

V chlorodiacetylacetonates or alkylorthovanadates (in which the alky group contain from 1 to 6 carbon atoms)/ Al dialkylmonohalides in which the alkyl groups contain from 1 to 8 carbon atoms;

$TiCl_3$; $VCl_3$/Al trialkyl or dialkyl monohalides in which the alkyl groups contain from 1 to 8 carbon atoms.

The solvents used for fractionating the crude copolymerizate to separate the different kinds of copolymers comprised therein were determined by us empirically, on the basic of the melting temperature of the different copolymers. In general, the crystalline copolymers which have the stereoregular alternating structure are dissolved by aliphatic hydrocarbon solvents having a boiling point higher than the melting point of the copolymer. It is recognized by us that the different copolymers we have separated and characterized may be separated from the crude using solvents other than those shown in our examples, and which could also be determined empirically. Therefore, we contemplate that, in practicing our invention, some variations may be made in respect to the solvents used for the fractionation which variations would be within the scope of our invention and the appended claims:

What is claimed is:

1. Normally solid copolymers of ethylene and a cyclo-olefin selected from the group consisting of cyclopentene and cycloheptene consisting essentially of linear macromolecules substantially made up of a regular 1:1 alternating succession of polymerized ethylene units and polymerized units of the selected cycloolefin in which latter units the tertiary carbon atoms have a regular steric configuration whereby, the copolymers exhibit, on X-ray examination at room temperature, practically no crystallinity of polyethylenic type but do exhibit at least 50 percent of crystallinity resulting from the regularly alternating arrangement of the polymerized ethylene units and the polymerized cycloolefin units in which the tertiary carbon atoms have the regular steric configuration, the copolymers having an identity period of 9.0±0.2 A. determined by X-ray examination of stretched, annealed fibers thereof.

2. Copolymers according to claim 1 further characterized in being copolymers of ethylene with cyclopentene, having a melting point of 180 to 185° C. and lattice distances of 5.83 A., 4.92 A. and 4.37 A., respectively.

3. Copolymers according to claim 1, further characterized in being copolymers of ethylene with cycloheptene having a melting point of about 160° C. and lattice distances of 10.10 A., 5.37 A. and 4.76 A., respectively.

4. The process for producing copolymers as defined in claim 1, which process comprises polymerizing a mixture of ethylene and the selected cyclo-olefin in an ethylene/cyclo-olefin molar ratio of 25:1 to 200:1 in liquid phase, at a temperature between −80° C. and +10° C., and in contact with a catalyst which is colloidally dispersible to completely soluble in the liquid phase in which the copolymerization is carried out and which is prepared by mixing a hydrocarbon-soluble vanadium compound with an organometallic compound of a metal belonging to one of Groups I to III inclusive of the Periodic Table according to Mendeleef, and recovering the copolymers as defined in claim 1 from the resulting total copolymerizate by fractional dissolution.

5. The process according to claim 4, characterized in that the liquid phase consists of the cyclo-olefin.

6. The process according to claim 4, characterized in that the copolymerization is carried out in an inert hydrocarbon solvent selected from the group consisting of aliphatic and aromatic hydrocarbons.

7. The process according to claim 4, characterized in that the catalyst is prepared by mixing the vanadium compound with an aluminum compound selected from the group consisting of aluminum trialkyls and dialkyl aluminum halides.

8. Thermoplastic compositions comprising copolymers as defined in claim 1.

9. Manufactured shaped articles comprising copolymers as defined in claim 1.

10. Fibers comprising a copolymer as defined in claim 1.

11. Films comprising copolymers as defined in claim 1.

References Cited

UNITED STATES PATENTS 2,945,845  7/1960  Schmerling _____ 260—93.7
3,058,963  10/1962  Vandenberg _____ 260—88.2

OTHER REFERENCES

Gaylord et al.: Linear and Stereoregular Addition Polymers, Interscience Publishers, New York, N.Y. (1959), pp. 213–217.

JOSEPH L. SCHOFER, *Primary Examiner.*

M. B. KURTZMAN, *Assistant Examiner.*

UNITED STATES PATENT OFFICE
CERTIFICATE OF CORRECTION

Patent No. 3,385,840

May 28, 1968

Giulio Natta et al.

It is certified that error appears in the above identified patent and that said Letters Patent are hereby corrected as shown below:

Column 8, lines 67 and 68, "rich in reflections attributable to an alternated ethylene-steric structure." should read -- rich in reflections attributable to an alternated ethylenecyclopentene copolymer, having a high regularity of steric structure. --.

Signed and sealed this 11th day of November 1969.

(SEAL)
Attest:

Edward M. Fletcher, Jr.
Attesting Officer

WILLIAM E. SCHUYLER, JR.
Commissioner of Patents